Patented Dec. 18, 1945

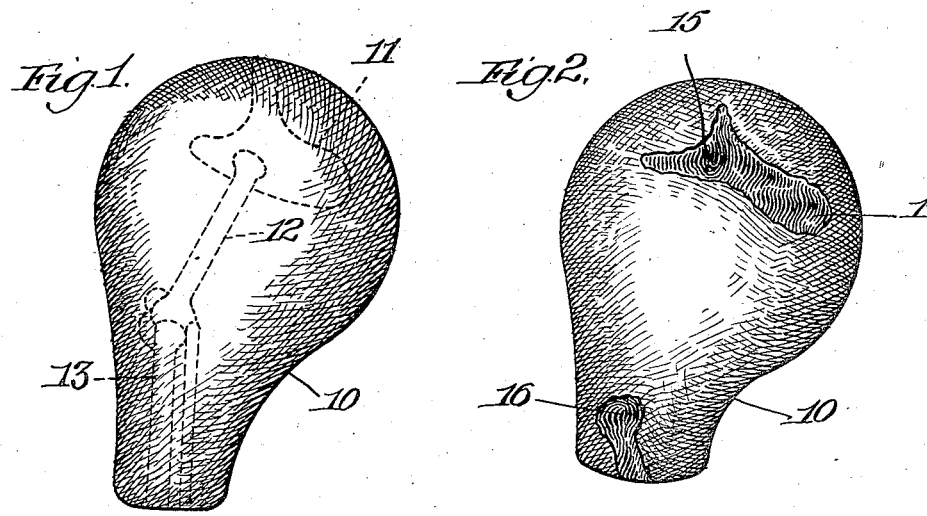
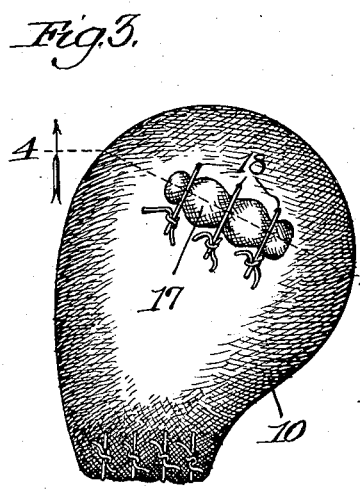
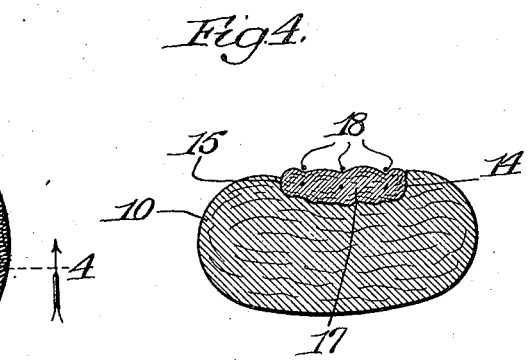
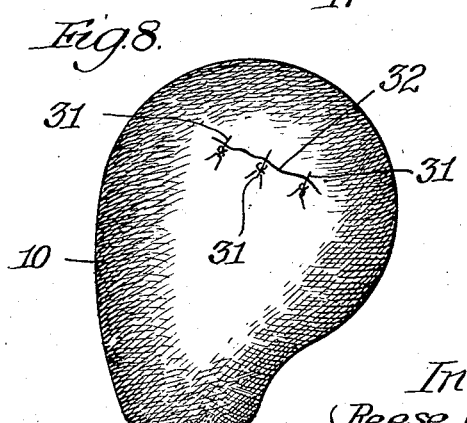

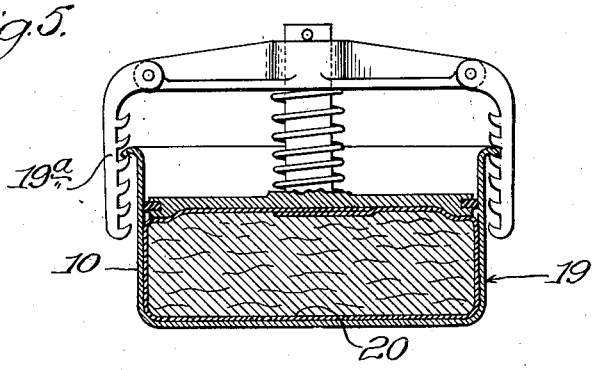
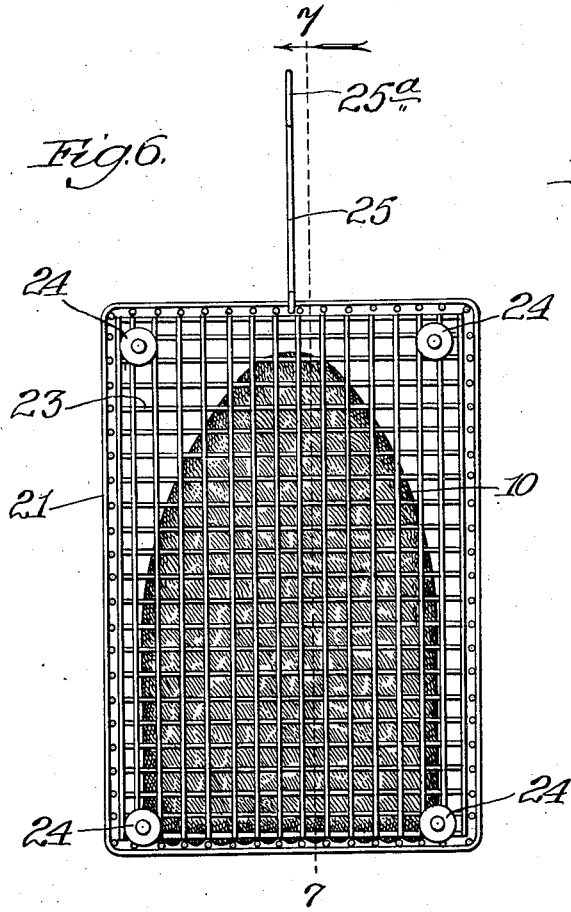
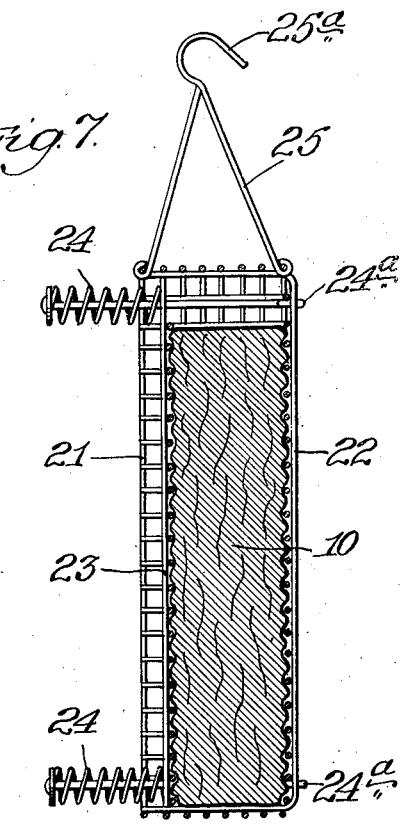

2,391,338

UNITED STATES PATENT OFFICE

2,391,338

HAMS AND PREPARATION THEREOF

Elmer C. Oswald and Reese Gardiner Lewis, Chicago, Ill., assignors to Armour and Company, Chicago, Ill., a corporation of Illinois Application December 20, 1940, Serial No. 370,930

6 Claims. (Cl. 99—157)

This invention relates to dried hams and processes for preparing them. The invention deals more particularly with dried hams, such as Italian hams, to obtain a boneless product. The present application constitutes a continuation in part of our co-pending application, Serial No. 306,708, for "Preparation of hams," which has matured into Patent No. 2,227,738 of January 7, 1941.

The hams here referred to are those which in the course of preparation are subjected to extended drying treatment and which are quite firm and hard. Typical of this class of hams are the "Italian" hams and the "Virginia" hams, which have been marketed for many years and still are in demand, particularly in certain localities.

In all prior processes it has never been possible to dry the ham with the bone removed, and a very serious objection to the dried hams heretofore on the market is that due to the presence of the bone the ham is hard to cut into suitable slices and the meat retailer has never been able to get a satisfactory yield in cutting the meat from the bone. Because of the bone, the marketman has not been able to use a slicing machine, and since the meat is firm and hard he cannot carve it effectively with a knife. The customary way of slicing such hams is to cut them more or less parallel with the bone, and this is wasteful and usually requires cutting with the grain of the meat. From a standpoint of tenderness and palatability, it would be desirable to cut against the grain of the meat, but the bone contained in this firm type of ham has heretofore made this impracticable.

Though hams of the soft, tender type have long been prepared in boneless form, the severe drying treatment characteristic of dried ham processes has heretofore prevented boning of such hams. The problem of drying a boned ham is made particularly difficult because of the opportunity during the long drying period for growth of microorganisms which deleteriously affect the product. It has been found impossible to remove the bone from a ham without inoculating the cavity with objectionable micro-organisms to at least some degree. In the later extended drying period, these organisms will normally grow and the bone cavity provides a place very favorable to such organisms during this period.

An important object of this invention is to provide in boneless form a ham product which has all the body and flavor characteristics of the dried type of hams, and another object is to provide a procedure for preparing a boneless dried ham product wherein the objectionable growth of micro-organisms in the course of continued drying is held to a minimum.

We have found that by maintaining a boned ham under pressure during the drying period, the growth of objectionable organisms within the ham is substantially reduced and in addition we have found that by placing fat in a bone cavity prior to the application of pressure, we can further restrict the growth of objectionable organisms within the ham. And we have further found that objectionable organisms can be restricted even more effectively by the use of gelatin for sealing the walls of the fissures and cavities together. These and other details of the invention will be more clearly understood after the following detailed explanation.

In the accompanying drawings:

Figure 1 illustrates a fresh ham at the start of the treatment, the bones being shown in dotted outline;

Fig. 2 shows the ham after the shank end has been severed and the bone removed;

Fig. 3 shows the boned ham after the fat has been placed in the bone cavity;

Fig. 4 is a sectional view taken at line 4—4 of Fig. 3;

Fig. 5 shows the ham being pressed in a mold;

Fig. 6 is a front view of the ham as held under pressure during the drying period;

Fig. 7 is a sectional view taken as indicated at line 7—7 of Fig. 6; and

Fig. 8 shows a boned ham prepared in accordance with a modified form of the invention in which a portion of the skin is cut away and the channel within the ham closed, with gelatin filling the cavities.

The following detailed description of the manufacture of Italian ham explains one mode of practicing the invention:

The hams to be treated may be placed in a vat in contact with the curing composition commonly used in the preparation of this particular type of dried ham, and may be left in cure for about 30 to 50 days as is the usual custom. At the close of this curing period, the hams may then be soaked in warm water for about an hour to soften them preparatory to boning.

As shown in Figure 1, the ham 10 contains the aitchbone 11, the femur 12, and the shank bone 13. The aitchbone is carved out and removed, and this leaves a channel-like cavity 14, as shown in Fig. 2.

Preferably, the extreme shank end of the ham is severed and removed since this enables easier boning and a more convenient shape for pressing. In removing the shank and femur, these bones are chiseled about from each free end and then pulled endwise from the ham. This leaves a rather ragged opening at 15 which deepens cavity 14, and also an opening 16 at the shank end. Preferably the shank end of the ham is then stitched as shown in Fig. 3 to bring the skin or flesh over the end of the ham and to close opening 16.

If desired, pieces of fat 17 may be filled into the cavity 14 and opening 15, and with the fat so placed, the edges of the cavity may be pulled up firm with the fat by taking stitches 18. Figs. 3 and 4 show the ham as fatted and sewed, ready for pressing.

The ham may be put in the press 19, which press may be of pear-shape cross section and may be lined with a suitable parchment paper 20. When the clamps 19ª of the press are set, the meat is under spring pressure of, for example, about 100 pounds per square inch, and may be left so compressed for about ten days. During this period the meat assumes a definite shape and drains off excess moisture.

When removed from press 19, the ham is placed in a perforate press, such as the wire mold 21 shown in Figures 6 and 7. The mold 21 is formed of wire mesh and comprises a container 22 and cover 23. The cover is pressed down tightly against the ham by means of spring-pressed rods 24 which have their hooked ends 24ª engaged about a wire of the container bottom. A bracket 25 supports the mold and has a hook 25ª for convenience in hanging the mold in the drying room.

The mold 21 containing the ham 10 under pressure is hung in a drying room for from about 30 to 60 days. If an especially hard Italian ham is desired, the drying may be extended even beyond 60 days. Also the drying time may be somewhat less than 30 days if the room temperature is somewhat higher, but must not be less than 20 days using a temperature of about 50 degrees F. if a ham of the type herein contemplated is to be produced. After the hams have been thoroughly set and have been under pressure during the first part of the extended drying period, the pressure on the hams may, if desired, be relieved during the remainder of the period.

During the drying period, the ham loses moisture and also changes its flavor somewhat. The change in flavor may be due to drying or to aging or both, and is characteristic of hams of this type.

The ham as thus prepared is compact in shape and contains meat of the same body and flavor characteristics as the ordinary Italian hams containing bones. It will be apparent that this product may be placed in the slicing machines now in common use in meat markets and may be sliced in slices of any desired thickness. The slicing may be done across the grain of the meat thereby cutting the fibers and making the meat more palatable. A very important advantage is gained in obtaining a substantially greater yield of meat slices from the dried ham, and another important advantage is in the greater convenience to the retailer in the marketing of this type of ham.

The detailed description herein set forth gives one specific mode of making a boneless Italian ham by our new process, but it is expected that the specific procedure may be varied greatly in accordance with common knowledge in the meat packing industry, while still utilizing the features of our invention.

Instead of curing the ham prior to the removal of the bones, as explained in the foregoing example, the ham may first be boned and then placed in cure; and after being cured may be treated as explained in the example given.

Other kinds of hard or dried hams may be prepared by our improved method, such as the Virginia ham. The principal variations for producing other kinds of hard hams consists of using a different kind of curing composition, trimming the ham differently, or in using different times and temperatures at certain stages of the process. In preparing the Virginia ham the drying period may be from three to six months under ordinary drying conditions, but may be less than this under special controlled drying conditions employing higher temperatures.

Our invention deals exclusively with the hard or dried type of hams, and must be clearly distinguished from other processes where the extended drying period is not employed. In this description and the appended claims, the term "dried hams" will be understood to mean hams which have been subjected to the drying and aging treatment for at least a period the equivalent of 20 days in a drying temperature of 50° F.

As previously stated, this extended drying period makes this type of ham peculiarly subject to spoilage through growth of objectionable organisms. We now find that the maintenance of pressure on the boned ham during the drying period operates to discourage the growth of objectionable organisms within the ham so that it is possible to dry a boned ham. We believe that an explanation for this is that the pressure during the drying period keeps the cracks and cavities from opening and excludes air from the cut and torn surfaces. When held in the compact mass with all cavities closed, it appears that the most favorable places for the growth of objectionable micro-organisms are eliminated.

It will also be understood that the feature of holding the ham under pressure during the drying period, works in conjunction with the initial compressing step in accomplishing the purpose intended. The initial pressing step, wherein the meat is compressed in a mold, serves to shape the meat and close the cavities, but as we have now found, this in itself is insufficient to prevent spoilage during the subsequent drying period. The strong pressure of the initial mold, however, does serve well in conjunction with the later pressing during drying to prevent formation of mold and bacterial disturbances. It is satisfactory if the pressure is applied sufficiently long during the drying period to avoid the formation of mold and the pressure need not extend through the entire period.

By the drying operation, the moisture content of the ham is reduced below 50%.

In Fig. 5 of the drawings is given a specific type of mold, but it is contemplated that other types of molds can be used. For example, the molds might have a different cross sectional shape, and may have different means for maintaining the pressure. It is, of course, desired that the mold used be sufficiently strong and provided with suitable means for maintaining a strong resilient pressure.

Other apparatus may also be substituted for that shown in Figs. 6 and 7. Wire molds have previously been used to form other types of meat products during application of heat in cooking, and some types of molds which have been used in this connection may be found suitable for pressing the ham during drying in the present process. It is essential, however, that the mold used be perforate so as to permit drying to take place without difficulty. Though no heavy pressure is required during drying, it is important that the screen or wire mold or any other suitable device used be sufficiently stiff and strong to insure against deformation of the ham or opening of any cavities during the drying period.

In the modification shown in Fig. 8, the skin portion about the shank is removed so as to provide no crevices, and the meat about the channel left by the withdrawal of the shank bone is suitably tucked into the channel and the channel closed by stitches. We have discovered that an extremely effective filling of the entire cavity can be brought about by introducing into the cavity a gelatin solution of any of the well-known varieties on the market. The gelatin is much more effective than the fat in preventing mold formation in the cavities and fissures because of its high sealing quality and the binding effect of the gelatin solution itself between the walls of the cavity. After the addition of the gelatin, the hams are then preferably subjected to pressure to bring the walls of the cavities more closely together with the gelatin providing an effective seal. The gelatin effectively excludes the air while at the same time uniting the walls of the cavity and forming a body of substantially solid cross section.

To introduce the gelatin, it is preferably heated sufficiently to flow well and is injected with a nozzle or other suitable means for injection into the crevices and fissures of the meat. We find that if the ham is heated to temperatures such as 110 or 120 degrees F. as is necessary in the heat treatment step after the gelatin has been added, this heat has a deleterious effect on the binding qualities of the gelatin and also tends to make the gelatin run out of the fissures to some extent. By inserting the gelatin after the heating step, we avoid these disadvantages.

After being treated with gelatin, the hams are preferably held under pressure while cooling takes place and the gelatin becomes "set." It is then better to allow the hams to remain under pressure in a perforate mold or between screens during at least a portion of the extended drying period.

The following is given as a specific example of this modified form of procedure:

*Example*

The hams are soaked for about three hours in water having a temperature of about 70 degrees F. and then hung in a room having a temperature of about 38 degrees F. and a relative humidity of about 75%. Then they are held overnight at about 50 degrees F. to facilitate boning.

Using regular long shank hams, the shank is cut off at the ankle joint and the skin removed from the shank so as to leave the face side of the ham free of skin. After chiseling and cutting about it from each end, the bone is removed from the meat. Three stitches, indicated by numeral 31, are taken in the face of the ham to close the aitchbone cavity, and after tucking in the shank edge portions, two stitches, indicated by the numeral 30, are taken at this point.

The boned ham is placed in a stockinette bag and then into a pear-shaped container in which it is subjected to strong pressure for about two days. Upon removal from the container, the ham is placed under pressure between screens and kept in a heated room for about three days.

Then the hams are taken from the pressure screens and a heated gelatin solution is injected by pumping it through a nozzle well into the bone cavities and any other fissures in the ham body, the gelatin being indicated by numeral 32 in Fig. 8.

The gelatin-treated ham is prepared and placed under pressure between the screens for about a week, and then hung in stockinette bags until the completion of the drying period. When dry, the hams have a moisture content below 50%.

The above specific example contains many specific details and these must not be taken to limit the invention in any way, the example being given to set forth more clearly one possible way for utilizing our invention.

The product which we obtain, notwithstanding the extremely long treating period extending over a month in time, is free of mold and has a solid cross section throughout. The long drying period does not bring about the formation of mold within the cavities, especially when utilizing the advantages of gelatin in producing a tight seal to thereby exclude air from contact with the cavity walls.

We claim:

1. A process for preparing dried hams, comprising removing the bone from the ham, introducing gelatin into the cavity to fill the space and to seal the cavity, pressing the ham to shape it in a compact mass of solid cross-section throughout in which air is substantially excluded from the interior of the mass, and subjecting the ham to a prolonged drying treatment to reduce the moisture content thereof to less than 50%.

2. A process for preparing dried hams, comprising removing the bones from the ham, sealing the cavity with a filling material, pressing the ham to shape it in a compact mass of solid cross-section throughout in which air is substantially excluded from the interior of the mass, and subjecting the ham to a prolonged drying treatment to reduce the moisture content thereof to less than 50%.

3. A process for preparing dried hams, comprising removing the bones from the ham, stitching the meat adjacent one end of the cavity, introducing gelatin to seal the cavity, stitching the other end of the cavity, and subjecting the ham to prolonged drying treatment while maintaining it under pressure during at least a substantial portion of said drying treatment.

4. A process for preparing dried hams, comprising removing the bones from the ham, introducing gelatin within the cavity to seal the same, and subjecting the ham to drying treatment while maintaining it under pressure for a period.

5. A process for preparing dried hams, comprising removing the bones from the ham, cutting away the skin about the shank of the ham, stitching the opening in the shank from which the shank bone was removed, pressing the ham to shape it in a compact mass whereby the walls of the bone cavity are brought together, and subjecting the pressed ham to an extended drying treatment sufficient to remove at least 50% of its moisture while maintaining it under pressure during a substantial portion of said drying treatment.

6. A process for preparing dried hams, comprising removing the bones from the ham, closing the opening in the ham from which the bone was removed, pressing the ham to shape it in a compact mass whereby the walls of the bone cavity are brought together, and subjecting the pressed ham to an extended drying treatment sufficient to reduce the moisture content to less than 50% while maintaining the ham under pressure during at least a substantial portion of the drying treatment.

ELMER C. OSWALD.
REESE GARDINER LEWIS.